US012764507B2

(12) United States Patent
Strunck et al.

(10) Patent No.: US 12,764,507 B2
(45) Date of Patent: Oct. 13, 2026

(54) METHOD AND DEVICE FOR VALIDATING VEHICLE-TO-X MESSAGES IN ORDER TO REGULATE THE TRAFFIC FLOW

(71) Applicant: Continental Automotive Technologies GmbH, Hannover (DE)

(72) Inventors: Sebastian Strunck, Niedernhausen (DE); Marc Menzel, Weimar (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 884 days.

(21) Appl. No.: 17/890,958

(22) Filed: Aug. 18, 2022

(65) Prior Publication Data

US 2023/0059220 A1 Feb. 23, 2023

(30) Foreign Application Priority Data

Aug. 19, 2021 (DE) ..................... 10 2021 209 134.2

(51) Int. Cl.

| | |
|---|---|
| ***H04W 4/029*** | (2018.01) |
| ***H04W 4/40*** | (2018.01) |
| ***H04W 12/106*** | (2021.01) |
| ***H04W 52/24*** | (2009.01) |
| *G08G 1/09* | (2006.01) |

(52) U.S. Cl.

CPC ........... *H04W 4/40* (2018.02); *H04W 12/106* (2021.01); *H04W 52/24* (2013.01); *G08G 1/09* (2013.01)

(58) Field of Classification Search

CPC ...... H04W 4/40; H04W 12/106; H04W 4/029
See application file for complete search history.

(56) References Cited

U.S. PATENT DOCUMENTS

| | | | | |
|---|---|---|---|---|
| 2013/0329651 | A1* | 12/2013 | Lee | H04W 52/04 370/329 |
| 2014/0055288 | A1 | 2/2014 | Menzel et al. | |
| 2017/0032671 | A1 | 2/2017 | Toyama et al. | |
| 2018/0167360 | A1 | 6/2018 | Maeda et al. | |
| 2019/0068639 | A1 | 2/2019 | Alexander et al. | |
| 2019/0312738 | A1* | 10/2019 | Barrett | H04L 9/3263 |
| 2021/0067967 | A1* | 3/2021 | Arzelier | H04L 63/0823 |
| 2022/0345856 | A1* | 10/2022 | Frye | H04W 4/40 |
| 2023/0422006 | A1* | 12/2023 | Priller | H04W 4/40 |

(Continued)

FOREIGN PATENT DOCUMENTS

| | | |
|---|---|---|
| CN | 106407806 A | 2/2017 |
| CN | 111932918 A | 11/2020 |

(Continued)

OTHER PUBLICATIONS

First Office Action and Search dated Feb. 25, 2025 from corresponding Chinese patent application No. 202210985054.2.

(Continued)

*Primary Examiner* — Barry W Taylor

(57) ABSTRACT

A method for validating vehicle-to-X messages by a computing apparatus of a vehicle comprises receiving at least one vehicle-to-X message comprising information for regulating the traffic flow, and validating the at least one message, wherein, within the framework of the validation, at least a part of the message content comprised by the at least one message is checked for the consistency thereof. A device for validating vehicle-to-X messages and a vehicle are also disclosed.

16 Claims, 2 Drawing Sheets

(56) References Cited

U.S. PATENT DOCUMENTS

| | | | | |
|---|---|---|---|---|
| 2024/0135809 | A1* | 4/2024 | Li | G08G 1/0116 |
| 2024/0323657 | A1* | 9/2024 | Yang | G06Q 50/26 |

FOREIGN PATENT DOCUMENTS

| | | | |
|---|---|---|---|
| DE | 102011018571 | A1 | 10/2012 |
| DE | 102016114023 | A1 | 4/2017 |
| DE | 102019215095 | A1 | 4/2021 |
| WO | 2015184962 | A1 | 12/2015 |

OTHER PUBLICATIONS

Office Action dated Mar. 22, 2022 from corresponding German patent application No. 10 2021 209 134.2.
Office Action dated Aug. 19, 2025 from corresponding German patent application No. 10 2021 006 573.5.

* cited by examiner

METHOD AND DEVICE FOR VALIDATING VEHICLE-TO-X MESSAGES IN ORDER TO REGULATE THE TRAFFIC FLOW

CROSS REFERENCE TO RELATED APPLICATIONS

This U.S. patent application claims the benefit of German patent application DE 10 2021 209 134.2, filed Aug. 19, 2021, which is hereby incorporated by reference.

TECHNICAL FIELD

The present disclosure relates to a method for validating vehicle-to-X messages in order to regulate the traffic flow as well as a corresponding device.

BACKGROUND

Currently, some selected traffic control systems, for example traffic light systems, are being equipped in research and pre-development in such a way that they may send SPAT (Signal Phase and Timing) and MAP messages in accordance with ETSI or SAE by means of a corresponding transmitting apparatus. Vehicles which have a suitable vehicle-to-X (V2X) interface may edit the received information and provide it to the driver. Among other things, this relates to information about the lanes (MAP) and about the traffic light statuses or phases and when the traffic light statuses switch over (SPAT).

However, in the absence of effective safeguarding, in the sense of functional safety, against false messages, it has not been possible to utilize this information to date in order to provide, e.g., ACC (Adaptive Cruise Control), which knows the traffic light statuses on the basis of the information received from a traffic light system, evaluates said traffic light statuses, and is in a position to carry out interventions in the driving dynamics independently of the driver.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure is to improve the functional safety for communication between the infrastructure and the vehicle (V2I).

A first aspect of the disclosure relates to a method for validating vehicle-to-X messages by a computing apparatus of a vehicle, having the steps of receiving at least one vehicle-to-X message comprising information for regulating the traffic flow, and validating the at least one message, wherein, within the framework of the validation, at least a part of the message content comprised by the at least one message is checked for the consistency thereof.

An improvement of the functional safety of a vehicle may be achieved in vehicle-to-X communication and an assessment of how trustworthy a transmitter is may be obtained. In this embodiment, the message content describes in particular all of the information comprised by a message. The information for regulating the traffic flow accordingly represents at least a part of this message content. The vehicle-to-X message and, hereby, the information for regulating the traffic flow are received in particular from a transmitter of an infrastructure facility in order to regulate the traffic flow. In particular, the information for regulating the traffic flow represents information as transmitted, for example, by MAP or SPAT messages.

The message is validated in particular on the basis of the message content comprised by the received message, wherein different criteria may be examined alternatively and/or at least partially cumulatively, which will be discussed in greater detail below.

In accordance with an embodiment, if no consistency of the message content is ascertained, the message is discarded and/or the transmitter of the message is classified as not being trustworthy and/or at least a part of the message content, for example a part of the message content which is consistent, or the entire message content, is marked with a correspondingly low level of trust and further processed.

In principle, in particular in the event that no consistency of one or more messages has been ascertained, it may be provided that a warning signal is issued, for example in order to warn a driver of the vehicle by a man-machine interface or for processing by a (semi-)autonomous vehicle system. Other road users and/or an external central data processing apparatus may also be informed about this by a wireless interface.

In accordance with an embodiment, if the consistency of the message content is ascertained, the message is further processed and/or the transmitter of the message is classified as being trustworthy and/or at least a part of the message content is marked with a correspondingly high level of trust and further processed.

The improvement of the functional safety is based on examining the consistency of the information comprised by a single received message, as well as the information comprised by multiple consecutive, received messages.

In the case of the examination of consecutive, received messages of the same transmitter, said messages do not necessarily have to be received immediately consecutively. It may also be the case that messages of other transmitters are received between the temporally consecutive messages of the transmitter, the messages of which are being observed. The temporally consecutive messages of the same transmitter may, but do not necessarily have to, be consecutive in time in such a way that these were sent out by the transmitter immediately consecutively in time or were received immediately consecutively in time with respect to this transmitter as well. At least one message may have also been sent out by the transmitter between these messages.

As a result, V2X messages received by one road user may be validated in order to assess the trustworthiness of a transmitter and therefore improve the functional safety from the viewpoint of the receiving vehicle. In particular, false messages may be recognized, the contents of which could possibly jeopardize traffic safety if the truthfulness thereof were accepted without restrictions. A false message in this sense is in particular understood to be a message which purports to have been sent out by a respective traffic control apparatus and/or comprises manipulated information. Manipulated information may also arise as a consequence of access to the traffic control system and/or other transmitters by a third party (hacker attack). Consequently, a transmitter classified as being trustworthy is in particular understood to be a transmitter which has been assessed as being authentic and which does not send out false messages, for example messages having erroneous content. In principle, it may also be assumed that, even in the case of a plurality of false messages, over an observed period of time, at least one non-false message in particular from a traffic control apparatus is received. Based on the entire context of the messages, an attempt may now be made to identify the non-false message.

That is to say that the functional safety of the entire communicating system made up of traffic control system(s) and road user(s) may, consequently, also be improved.

In accordance with an embodiment, a reception rate of at least two consecutively received messages, the comprised information of which displays the same transmitter, is established and the reception rate is subsequently compared with a threshold value. In particular it is examined whether the reception rate of the at least two messages is less than or equal to a predefined threshold value of the reception rate. For an ultimately positive validation with respect to this criterion of the at least one message, the reception rate of the at least two messages should be less than or equal to the predefined threshold value of the reception rate. The threshold value may, for example, be stipulated in such a way that a transmission rate according to the specifications is mapped for a particular message type, wherein these messages of the same message type do not necessarily have to have been received immediately consecutively, and/or in principle a maximum transmission rate of a transmitter. In this way, deceptions may be recognized.

The received message has in particular information and/or a message type which is usually sent out by a traffic control apparatus such as, for example, a traffic light system. According to a further development, the information describes a signal status of a traffic control apparatus and/or a remaining signal status time and/or a topological definition of lanes, for example for a junction or a stretch of road, and/or connections between stretches of road and/or a type of the lanes and/or lane-related movement restrictions. Related message types are for example SPAT (Signal Phase and Timing) and/or MAP messages in accordance with ETSI or SAE.

The statuses and remaining status time of a complete traffic control system are mapped all at once, for example, in the specified message format SPAT in such a way that not only is the information directly relevant to a road user with regard to the lane being driven along received, but also information relevant to all of the other routes to be regulated by the traffic control system.

In accordance with an embodiment, the message content comprises signal status information for describing an authorization to proceed for a multiplicity of lanes of a roadway, wherein the vehicle executing the method in particular is driving along one lane of the multiplicity of lanes, and wherein the consistency of the signal status information of at least a part of the multiplicity of lanes is examined. It therefore becomes possible for the receiving road user, together with the information comprised, e.g., by a MAP message, to perform a validation of the traffic control signal for the lane being driven along by the vehicle in the case of a received signal allowing said vehicle to proceed, e.g., a green traffic light status, compared to other lanes, wherein the traffic control system should not output a signal allowing vehicles to proceed, for example for all of the other lanes which cross said vehicle's own lane or which could result in a collision with other road users as a consequence of the proceed signal for the vehicle, or a stop signal should be output.

In accordance with an embodiment, the message content comprises signal status information for describing an authorization to proceed, wherein the signal status information is examined with a light detection system, e.g., with the aid of at least one vehicle camera, of the vehicle. For example, in the case of a traffic light system, the vehicle is authorized to proceed when the signal is green and is not authorized to proceed when the signal is red, which may be detected by means of the vehicle camera and may accordingly be utilized for checking the message content.

According to a further development, it may consequently be provided that the signal status information comprised by a received SPAT message is verified with a light detection system of the vehicle, e.g., with the aid of at least one vehicle camera.

In accordance with an embodiment, the message content comprises topological definitions of lanes, wherein the consistency of the topological definitions of the lanes with features of the infrastructure detected by environment sensors of the vehicle is examined. Examples of features of the infrastructure which may be examined are, in this case, the number of lanes, turning lanes, number of groups of traffic light signals, curvature of the roadway, width of the roadway or of the lane.

In accordance with an embodiment, the information comprised by a received MAP message is validated by comparing the features of the infrastructure described by the information comprised by the MAP message with features of the infrastructure detected by environment sensors of the vehicle.

Tolerances, in which deviations between the features of the infrastructure described by the topological definitions of the lanes of the message content and the features of the infrastructure detected by the environment sensors of the vehicle are to be deemed to be acceptable for the comparison, depend in particular on the vehicle sensors used or the detection accuracy thereof, taking into account situational surrounding conditions. For example, dependencies may arise due to the physical measuring principle of the respective sensor, the weather, the traffic density, etc. The tolerances may in principle be designed to be fixed and/or adaptable.

Moreover, it may be taken into account during the examination that only a part of the features of the infrastructure described by the information, for example of the received MAP message, may be examined, since not all of the features of the infrastructure described by the information of the received MAP message may be detected by the sensors of the vehicle.

In accordance with an embodiment, a reception direction of the signal transmitting the received message is established for the check and it is examined whether the established reception direction of position information for describing a position of the transmitter, which is comprised by the message content, is inconsistent. Taking the position of the transmitter as a basis and taking into account an established ego-position of the vehicle receiving the message, for example by a GNSS receiver of the vehicle, it may consequently be examined whether the signal transmitting the message is arriving from the direction which would be expected with respect to the position of the transmitter. If, in this case, it is ascertained that a deviation exceeding a tolerance between the established reception direction and the established expected reception direction exists, an attempt at deception may possibly exist. The tolerance may in principle be designed to be fixed and/or adaptable. The reception direction may be established, for example, by detecting a difference in the signal power and/or phasing of the signal transmitting the message when received by at least two antennas of the vehicle. At least one antenna array having at least two elements and/or at least two antennas may in particular be provided as the receiving apparatus of the vehicle.

In accordance with at least one embodiment, a reception power (RSSI) of the signal transmitting the received message is established and it is examined whether the established reception power of position information for describing a position of the transmitter, which is comprised by the message content, is inconsistent. Taking the position of the transmitter as a basis and taking into account an established ego-position of the vehicle receiving the message, for example by a GNSS receiver of the vehicle, it may be examined whether the signal transmitting the received message has a reception power which would be expected with respect to the position of the transmitter. Consequently, it is possible to carry out a validation as to whether the established reception power coincides with the calculated distance between the transmitter and receiver. If, in this case, it is ascertained that a deviation exceeding a tolerance exists, an attempt at deception may possibly exist. The tolerance may in principle be designed to be fixed and/or adaptable.

In accordance with an embodiment, on the basis of the established reception power, a transmission power is established with which the signal transmitting the received message was sent out by the transmitter, and it is examined whether the established transmission power is inconsistent with a transmission power according to the specifications. The transmission power is in particular determined by utilizing position information for describing a position of the transmitter, which is comprised by the received message, and/or in particular by utilizing an established ego-position of the vehicle receiving the message. Furthermore, an established reception power of the signal transmitting the received message is in particular taken as a basis for the determination of the transmission power. A simplified channel model may be calculated for the establishment of the transmission power. In order to validate whether a transmission power according to the specifications is provided, the established transmission power is, according to a further development, compared with a maximum transmission power (EIRP) in particular of a used channel which is deployed in order to transmit the signal transmitting the received message, and if the established transmission power is less than or equal to the maximum transmission power and/or greater than or equal to a minimum transmission power, a transmission power according to the specifications is provided. If the established transmission power deviates from a transmission power according to the specifications, then no transmission power according to the specifications is provided, wherein in this case an attempt at deception may possibly exist. A specification which is taken as a basis can be, for example, a specification defining the transmission power of a relevant vehicle-to-X communication standard.

In order to carry out the calculations of the reception power and/or transmission power, the antenna characteristics of the receiving antenna(s) can be stored in a data memory and utilized for the calculations.

According to a further development, objects such as, for example, buildings, which may influence the reception power of the signal transmitting the received message, are taken into account during the establishment of the transmission power. Information for describing the objects may be stored in at least one digital data memory or a digital map, wherein the data memory or data memories can be comprised by the vehicle and/or a data processing apparatus external to the vehicle.

In particular, the transmission power is established for message types which are excluded from a reduced transmission power according to the specifications, e.g., Electronic Emergency Brake Light (EEBL) or triggering of an airbag. A maximum transmission power according to the specifications is not applied to all message types, so that it may be ascertained comparatively well for message types excluded from a reduced transmission power according to the specifications whether the used or established transmission power is, for example, higher than the maximum transmission power according to the specifications. Alternatively or in addition, the transmission power is established if the vehicle is located in an area in which sending out of messages having a, in particular maximum, transmission power according to the specifications is not permitted. These areas are, by way of example, toll zones, as this may lead to interference. The areas may either be stored in a digital map and/or sent by a Road Side Unit (RSU) with a CAM message. Message types which are excluded from a reduced transmission power according to the specifications are recorded, for example, in at least one specification of a relevant vehicle-to-X communication standard.

In accordance with an embodiment, the message content comprises information for describing a transmission power of the signal transmitting the message, wherein it is examined whether the established reception power is inconsistent with the information for describing the transmission power, which is comprised by the message content, and/or whether the established transmission power is inconsistent with the information for describing the transmission power, which is comprised by the message content. The information for describing the transmission power is, in this case, added by the transmitter of the message itself, wherein the insertion of the information may be realized in such a way that a manipulation by a third-party access is made difficult compared, for example, to other information comprised by the message, as a result of which the information security is increased on the one hand, and, on the other hand, the functional safety may be increased in accordance with this embodiment. Consequently, it is possible to observe the transmission path more precisely, which helps to further improve the safety if it is assumed that the transmission power indicated in the message corresponds to the transmission power actually used. The transmission power obtained on the basis of this information may, furthermore, be used in the sense of the validation of the message, for example in a comparable manner to the transmission power determined on the receiver side on the basis of the signal. According to a further development, the information for describing the transmission power, which is comprised by the received message, may be utilized for a comparison with the established transmission power. A significant difference between the values may have its cause, on the one hand, in the transmission path and/or in an erroneous indication of the transmission power in the received message, so that if the transmission path is not sufficiently known, it is not possible to immediately infer a possible intention to deceive. This circumstance is expediently taken into account if the transmission power indicated in the message is to be utilized for a validation of the message.

In accordance with one embodiment, the message content is checked by utilizing information for describing features concerning the transmitter, and the information for describing features concerning the transmitter is stored in a data memory of the vehicle and/or is provided by a data processing apparatus not belonging to the vehicle. Features concerning the transmitter may be, for example, the position thereof and/or an identifier. According to a further development, the information for describing features concerning the transmitter may be comprised by a digital map. The digital map and/or the information for describing features concerning the transmitter may be saved in a data memory of the vehicle and/or can be provided by wireless data transmission, for example by a central/decentralized data processing apparatus (Cloud Computing, Edge Computing). The information for describing features concerning the transmitter addressed herewith is not provided by the transmitter itself. The position of traffic control systems does not usually change and is very precisely known and may be saved, statically or at least temporarily, in a map, which is why information concerning traffic control systems may in particular be utilized for the validation of a received message. If, for example, a message is received from a transmitter for which no information for describing features concerning the transmitter is stored in the data memory or the digital map and also no information is otherwise received from a data processing apparatus which is not the transmitter, this transmitter can thus be regarded as not being trustworthy for the further processing of the message and, possibly, other messages from this transmitter.

In accordance with one embodiment, the message content of at least two received messages displaying the same transmitter is utilized for checking at least one item of this message content of the at least two received messages. According to a further development, the message content of the at least two received messages comprises traffic control signals which are examined in their temporal sequence and/or timing for inconsistencies. For an ultimately positive validation with respect to this criterion of the at least one validated message, the traffic control signals described by the information of the at least two messages may not have any inconsistencies in their temporal sequence and/or timing. Consequently, for a positive validation of a message, at least one of the following prerequisites in particular must exist:

The statuses of the traffic control signals, for example traffic light statuses, may not have any inconsistencies, e.g., may not oscillate quickly. In this regard, it may be a prerequisite that a status of a traffic control signal has to persist for at least, for example, 3 s. The timing of traffic control signal statuses, for example traffic light statuses, should only deviate in certain cases from the timing of previous traffic control signal statuses, which may likewise be established by received messages. In other words, the duration of the statuses of the traffic control signals should usually be consistent or not have any inconsistencies. Specific cases, in which there is no inconsistency in this sense, to be taken into account are, by way of example, pedestrian requests to cross a roadway, wherein even in these specific cases there are not allowed to be any other inconsistencies in the traffic control signals such as the vehicle being allowed to proceed at the same time as the instruction to cross the same roadway is displayed to the pedestrian. For example, such a precondition could require that the signal statuses cannot have been updated more than 2 s before a signal status change. The reception rate of messages displaying the same transmitter (and consequently, presumably, the transmission rate of the same transmitter) may not exceed a predefined threshold value. If, for example, messages of the same transmitter, due to a reception rate above a threshold value, virtually block the reception of messages from other transmitters, it may be provided that the messages of this transmitter are substantially discarded without further processing, since this can in particular be an interfering transmitter.

This validation is in principle not only relevant in the event that messages have been sent out by a traffic control apparatus, but in particular also relevant to communication from road user to road user or vehicle to vehicle.

A further aspect of the disclosure relates to a device which is configured to perform a method according to at least one of the preceding embodiments. The device may, in particular, be used in a vehicle.

The vehicle may be a motor vehicle, in particular a car, a truck, a motorcycle, an electric vehicle or a hybrid vehicle, a watercraft or an aircraft.

The device may, for example, be a computing apparatus or an electronic control unit. A computing apparatus may be any apparatus which is designed to process at least one of the indicated signals. In particular, the computing apparatus may be a processor, for example an ASIC, an FPGA, a digital signal processor, a central processing unit (CPU), a multi-purpose processor (MPP) or similar.

In a further development of the indicated device, the indicated device has a memory. The indicated method is stored in the memory in the form of a computer program and the computing apparatus is provided to carry out the method when the computer program is loaded from the memory into the computing apparatus.

According to a further aspect of the disclosure, a computer program comprises program code in order to perform all of the steps of one of the indicated methods when the computer program is run on a computer or one of the indicated devices.

According to a further aspect of the disclosure, a computer program product contains program code which is saved on a computer-readable data carrier and which, when it is run on a data processing apparatus, performs one of the indicated methods.

BRIEF DESCRIPTION OF THE DRAWINGS

The present disclosure will become more fully understood from the detailed description and the accompanying drawings, wherein.

DETAILED DESCRIPTION

Figure 1:
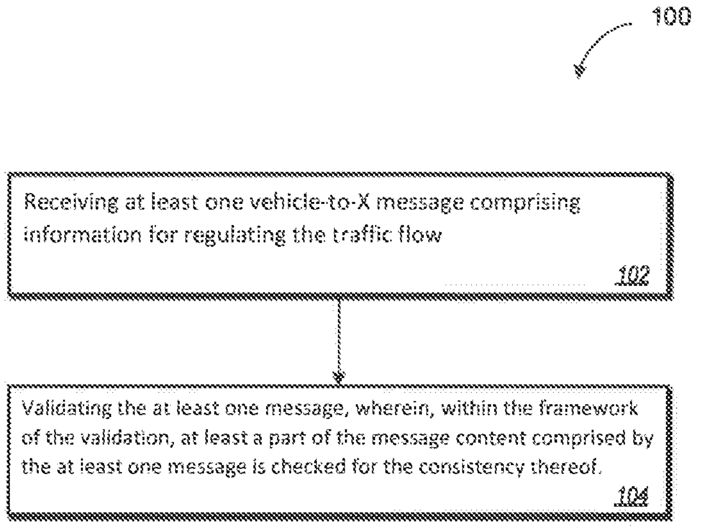
FIG. 1 schematically shows an embodiment of a method for validating vehicle-to-X messages according to this disclosure.

FIG. 1 shows an embodiment of the method 100 for validating vehicle-to-X messages by a computing apparatus of a vehicle, wherein, in a step 102, at least one vehicle-to-X message comprising information for regulating a traffic flow is received and, in a step 104, the at least one message is validated, wherein, within the framework of the validation, at least a part of the message content comprised by the at least one message is checked for the consistency thereof.

Figure 2:
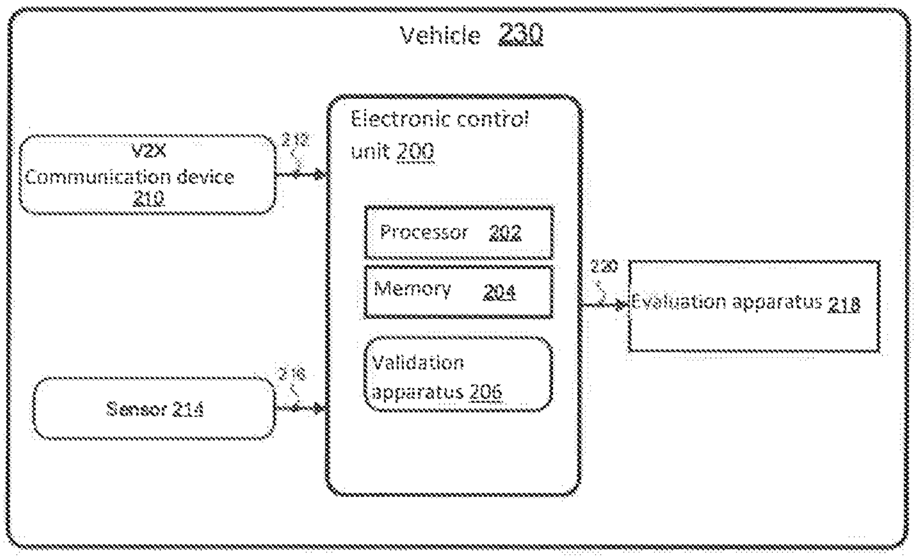
FIG. 2 schematically shows an embodiment of the device according to this disclosure.

FIG. 2 shows an embodiment of an electronic control unit 200 for validating vehicle-to-X messages, which is configured to carry out the steps according to at least one embodiment of the described method. The electronic control unit is also carried along by a vehicle 230 or is mounted therein.

In this embodiment of the electronic control unit 200, the indicated device has a processor 202 and a memory 204. The indicated method is stored in the memory 204 in the form of a computer program and the device 200 is provided for carrying out the method when the computer program is loaded from the memory into the processor 202.

The electronic control unit is configured to receive at least one vehicle-to-X message 212, which comprises information for regulating a traffic flow, by a vehicle-to-X (V2X) communication device 210 and to validate the at least one message by a validation apparatus 206, wherein, within the framework of the validation, at least a part of the message content comprised by the at least one message 212 is checked for the consistency thereof. The V2X communication device 210 may be designed, for example, as an antenna device to receive V2X messages, wherein the messages or message content is/are processed by the electronic control unit 200. The consistency is checked in accordance with at least one embodiment, utilizing sensor data 216 of at least one sensor 214 of the vehicle 230.

In accordance with at least one embodiment, if no consistency of the message content is ascertained, the received message or the message content thereof is discarded and/or the transmitter of the message is classified as not being trustworthy and/or at least a part of the message content, for example a part of the message content which is consistent, or the entire message content is marked with a correspondingly low level of trust and is output to an evaluation apparatus 218 which takes account of the level of trust accordingly.

In principle, it may be provided, in particular in the event that no consistency of one or more messages has been ascertained, that a warning signal 220 is output to an evaluation apparatus 218, for example in order to warn a driver of the vehicle by a man-machine interface or for processing by a (semi-)autonomous vehicle system. Other road users and/or an external central data processing apparatus may also be informed about this by a wireless interface such as, for example, of the V2X communication device 210 or a telematics interface.

In accordance with one embodiment, if the consistency of the message content is ascertained, the message content or information 220 based on this is at least partially output to an evaluation apparatus 218 and/or the transmitter of the message is classified as being trustworthy and/or at least a part of the message content is marked with a correspondingly high level of trust and is further processed, taking into account the level of trust.

If in the course of the proceedings it transpires that a feature or a group of features is not absolutely necessary, then the applicant here and now seeks a wording of at least one independent claim no longer having the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of the invention, which are described in the various embodiments or exemplary embodiments and/or shown in the figures, may be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features may also be used in any combination with other features.

Features which are only disclosed in the description or features which are disclosed in the description or a claim only in conjunction with other features may, in principle, be of independent inventive relevance. They may therefore also be included separately in claims to distinguish from the prior art.

It should be pointed out in general that vehicle-to-X communication means, in particular, a direct communication between vehicles and/or between vehicles and infrastructure facilities, wherein the term does not imply the direction of the communication such that this term should be construed to mean, for example, vehicle-to-infrastructure communication (V2I) and infrastructure-to-vehicle communication (I2V). For example, therefore, vehicle-to-vehicle communication or vehicle-to-infrastructure communication may be involved. Where communication between vehicles is referred to within the framework of this application, this may essentially, for example, take place within the framework of vehicle-to-vehicle communication, which typically takes place without the intermediary of a mobile network or a similar external infrastructure and which is therefore to be distinguished from other solutions which, for example, are based on a mobile network. For example, vehicle-to-X communication may take place using the standards IEEE 802.11p or IEEE 1609.4. Vehicle-to-X communication may also be referred to as C2X communication or V2X communication. The sub-areas may be referred to as C2C (Car-to-Car), V2V (Vehicle-to-Vehicle) or C2I (Car-to-Infrastructure), V2I (Vehicle-to-Infrastructure). The invention expressly does not, however, exclude vehicle-to-X communication with the intermediary of, for example, a mobile network.

The invention claimed is:

1. A method for validating vehicle-to-X messages by a computing apparatus of a vehicle, the method comprising:
- receiving at least one vehicle-to-X message comprising information for regulating a traffic flow;
- validating the at least one message, wherein, within a framework of the validation, a message content comprising the at least one message is checked for a consistency thereof;
- wherein the message content includes one or more individual portions and a level of trust is determined for each of the one or more individual portions and each of the one or more portions are marked with a determined level of trust; and
- wherein, if any of the one or more individual portions is marked with a level of trust below a predefined threshold, the computing apparatus (i) refrains from using that portion of the message content to control vehicle operations and (ii) generates a warning signal indicative of potential inconsistency of that portion.

2. The method according to claim 1, wherein a reception rate of at least two consecutively received messages, the comprised information of which displays the same transmitter, is established and the reception rate is compared with a threshold value.

3. The method according to claim 1, wherein the message content comprises signal status information for describing an authorization to proceed for a multiplicity of lanes of a roadway, wherein the consistency of the signal status information of at least a part of the multiplicity of lanes is examined.

4. The method according to claim 1, wherein the message content comprises signal status information, wherein the signal status information is examined with a light detection system of the vehicle.

5. The method according to claim 1, wherein the message content comprises topological definitions of lanes, wherein the consistency of the topological definitions of the lanes with features of an infrastructure detected by environment sensors of the vehicle is examined.

6. The method according to claim 1, wherein a reception direction of a signal transmitting the received message is established and it is examined whether the established reception direction of position information for describing a position of a transmitter, which is comprised by the message content, is inconsistent.

7. The method according to claim 1, wherein a reception power (RSSI) of a signal transmitting the received message is established and it is examined whether the established reception power of position information for describing a position of a transmitter, which is comprised by the message content, is inconsistent.

8. The method according to claim 7, wherein, on the basis of the established reception power, a transmission power is established with which the signal transmitting the received message was sent out by the transmitter and it is examined whether the established transmission power is inconsistent with a transmission power according to specifications.

9. The method according to claim 8, wherein objects which can influence the reception power of the signal transmitting the received message are taken into account during the establishment of the transmission power.

10. The method according to claim 8, wherein the message content comprises information for describing a transmission power of the signal transmitting the message, wherein it is examined whether the established reception power is inconsistent with the information for describing the transmission power, which is comprised by the message content, and/or whether the established transmission power is inconsistent with information for describing the transmission power, which is comprised by the message content.

11. The method according to claim 7, wherein a transmission power is established if the received message corresponds to a message type which is excluded from a reduction of the transmission power, and/or if the vehicle receiving the message is in an area in which sending out messages having a transmission power according to specifications is not permitted.

12. The method according to claim 1, wherein the message content is checked by utilizing information for describing features concerning a transmitter, and the information for describing features concerning the transmitter is stored in a data memory of the vehicle and/or is provided by a data processing apparatus not belonging to the vehicle.

13. The method according to claim 1, wherein the message content of at least two received messages displaying the same transmitter is utilized for checking at least one item of this message content of the at least two received messages.

14. The method according to claim 13, wherein the message content of the at least two received messages comprises traffic control signals which are examined in their temporal sequence and/or timing for inconsistencies.

15. A device for validating vehicle-to-X messages, wherein the device is configured to:

receive at least one vehicle-to-X message comprising information for regulating traffic flow;

validate the at least one vehicle-to-X message, wherein, within a framework of the validation, at least a part of a message content comprised by the at least one message is checked for consistency;

wherein the message content includes one or more individual portions and a level of trust is determined for each of the one or more individual portions and each of the one or more portions are marked with a determined level of trust; and wherein, if any of the one or more individual portions is marked with a level of trust below a predefined threshold, the device (i) refrains from using that portion of the message content to control vehicle operations and (ii) generates a warning signal indicative of potential inconsistency of that portion.

16. A vehicle comprising:

a device for validating vehicle-to-X messages, wherein the device is configured to:

receive at least one vehicle-to-X message comprising information for regulating traffic flow; and validate the at least one vehicle-to-X message, wherein, within a framework of the validation, at least a part of a message content comprised by the at least one message is checked for consistency;

wherein the message content includes one or more individual portions and a level of trust is determined for each of the one or more individual portions and each of the one or more portions are marked with a determined level of trust; and wherein, if any of the one or more individual portions is marked with a level of trust below a predefined threshold, the device (i) refrains from using that portion of the message content to control vehicle operations and (ii) generates a warning signal indicative of potential inconsistency of that portion.

* * * * *